US008736751B2

(12) United States Patent
Yun

(10) Patent No.: US 8,736,751 B2
(45) Date of Patent: May 27, 2014

(54) DIGITAL PRESENTER FOR DISPLAYING IMAGE CAPTURED BY CAMERA WITH ILLUMINATION SYSTEM

(75) Inventor: Il Dong Yun, Seongnam-si (KR)

(73) Assignee: Empire Technology Development LLC, Wilmington, DE (US)

(*) Notice: Subject to any disclaimer, the term of this patent is extended or adjusted under 35 U.S.C. 154(b) by 1102 days.

(21) Appl. No.: 12/198,825

(22) Filed: Aug. 26, 2008

(65) Prior Publication Data

US 2010/0053415 A1   Mar. 4, 2010

(51) Int. Cl.
*H04N 5/222* (2006.01)
*G01N 21/86* (2006.01)
*G01V 8/00* (2006.01)

(52) U.S. Cl.
USPC .... 348/370; 348/371; 348/222.1; 250/559.01

(58) Field of Classification Search
CPC ............. G06F 3/0425; H04N 1/195; H04N 2201/0436; H04N 2201/0091; H04N 2201/0094; H04N 2201/0414; H04N 2201/0426; H04N 2201/044; H04N 2201/0442; H04N 2201/0444; H04N 2201/0446; H04N 2201/0448
USPC ......... 348/345, 370, 371; 250/559.01–559.09
See application file for complete search history.

(56) References Cited

U.S. PATENT DOCUMENTS

| | | | | |
|---|---|---|---|---|
| 5,515,181 A * | 5/1996 | Iyoda et al. | ................ | 358/474 |
| 6,088,612 A * | 7/2000 | Blair | ............................. | 600/407 |
| 6,965,460 B1 * | 11/2005 | Gann et al. | ..................... | 358/471 |
| 7,580,576 B2 * | 8/2009 | Wang et al. | .................... | 382/188 |
| 7,619,664 B2 * | 11/2009 | Pollard et al. | ................. | 348/241 |
| 7,630,002 B2 * | 12/2009 | Jenkins | ....................... | 348/218.1 |
| 7,835,589 B2 * | 11/2010 | Heaney et al. | ................ | 382/276 |
| 8,212,857 B2 * | 7/2012 | Keam | ............................... | 348/31 |
| 8,487,866 B2 * | 7/2013 | Bell et al. | ...................... | 345/156 |
| 8,519,952 B2 * | 8/2013 | Yee | ................................. | 345/156 |
| 2001/0002850 A1 * | 6/2001 | Slatter | ........................... | 348/370 |
| 2003/0095200 A1 * | 5/2003 | Nagano | ......................... | 348/373 |
| 2004/0233307 A1 * | 11/2004 | Tsujino | ......................... | 348/255 |
| 2006/0232583 A1 * | 10/2006 | Petrov et al. | .................. | 345/419 |
| 2007/0036530 A1 * | 2/2007 | Nakagomi | ...................... | 396/54 |
| 2007/0296997 A1 * | 12/2007 | Taneda | ......................... | 358/1.14 |
| 2008/0075335 A1 | 3/2008 | Martin et al. | | |

(Continued)

FOREIGN PATENT DOCUMENTS

CA   2 306 755 A1   3/1999
EP   1 653 408 A1   5/2006

(Continued)

OTHER PUBLICATIONS

Nayar, "Shape from Focus", Tech. Report CMU-RI-TR-89-27, Robotics Institute, Carnegie Mellon University (Nov. 1989).

(Continued)

*Primary Examiner* — Chia-Wei A Chen
(74) *Attorney, Agent, or Firm* — Knobbe Martens Olson & Bear LLP

(57) ABSTRACT

An image displaying apparatus includes a base capable of supporting an object, a camera configured to capture a plurality of images of the object, an illumination system housing a plurality of illuminators, an illumination control system configured to control illumination provided by the plurality of illuminators, and a focus control system configured to control a focus of the camera.

13 Claims, 4 Drawing Sheets

(56) References Cited

U.S. PATENT DOCUMENTS

| | | | | |
|---|---|---|---|---|
| 2008/0130943 | A1* | 6/2008 | Goda | 382/100 |
| 2008/0232712 | A1* | 9/2008 | Matsui et al. | 382/277 |
| 2008/0252671 | A1* | 10/2008 | Cannell et al. | 347/9 |
| 2009/0046146 | A1* | 2/2009 | Hoyt | 348/143 |
| 2009/0177416 | A1* | 7/2009 | Nilsagard et al. | 702/41 |
| 2010/0111768 | A1* | 5/2010 | Banerjee et al. | 422/82.08 |

FOREIGN PATENT DOCUMENTS

| | | |
|---|---|---|
| JP | 11-261797 | 9/1999 |
| JP | 2005-175716 | 6/2005 |
| JP | 2005-176093 | 6/2005 |
| JP | 2005-277813 | 10/2005 |
| JP | 2007-089086 | 4/2007 |
| KR | 10-0479983 | 5/2003 |
| WO | WO 99/13431 A1 | 3/1999 |

OTHER PUBLICATIONS

"Shape From Focus", http://sipl.gist.ac.kr/about/SFF1.htm, Signal and Image Processing Laboratory at GIST (Aug. 19, 2008).

Nayar, S.K and Nakagawa, Y., "Shape from Focus," IEEE Transactions on Pattern Analysis and Machine Intelligence, (Aug. 1994), pp. 824-831, vol. 16, No. 8.

"Super Bright LEDs—Bi-pin Base Bulbs," accessed at http://web.archive.org/web/20071218191802/http://www.superbrightleds.com/bipin.html#D17E62accessed on Dec. 27, 2013, pp. 1-5.

* cited by examiner

DIGITAL PRESENTER FOR DISPLAYING IMAGE CAPTURED BY CAMERA WITH ILLUMINATION SYSTEM

TECHNICAL FIELD

The present disclosure relates generally to digital presenters.

BACKGROUND

A digital presenter may be used to display a wide variety of media from printed materials (e.g., transparencies, documents, books, etc.) to other media such as slides, photographs or films, as well as 3-dimensional physical objects.

Unlike analog overhead projectors, a digital presenter may use a digital (still or video) camera to capture images of 2- or 3-dimensional objects that are then conveyed to other output devices (such as television screens or computer monitors) or displayed through an LCD projector, etc.

A digital presenter generally includes a light source(s) capable of providing sufficient illumination to detect and capture images of the media or object to be displayed. In this regard, since the digital presenter relies on a light source(s) for illumination, when an image is captured by the camera, specular reflection (highlight or glare) from the surface of the object to be displayed may adversely affect the quality of the image captured.

In addition, if the surfaces of the materials whose images are being captured are not sufficiently flat, then the captured images may be blurry or out-of-focus. For example, the portions of pages near the spine (or binding) of bound documents (such as books or magazines) tend to be curved, and as a result, such portions may not receive uniform or sufficient illumination, potentially making the images captured from these portions blurry and out-of-focus.

Conventional digital presenters may employ multiple light sources and/or cameras, and strategic positioning of the cameras and/or light sources may be needed for proper functioning—but such systems tend to be cumbersome and costly to implement.

SUMMARY

Embodiments of image displaying methods and apparatuses are disclosed herein. In one embodiment by way of non-limiting example, an image displaying apparatus includes a base capable of supporting an object; a camera configured to capture a plurality of images of the object; an illumination system housing a plurality of illuminators; an illumination control system configured to control illumination provided by the plurality of illuminators; and a focus control system configured to control a focus of the camera.

In another embodiment, a method for displaying an image includes capturing a plurality of images of an object; comparing respective pixels of the plurality of images; selecting one pixel from the respective pixels of the plurality of the images; forming an image from the selected pixels; and outputting the image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
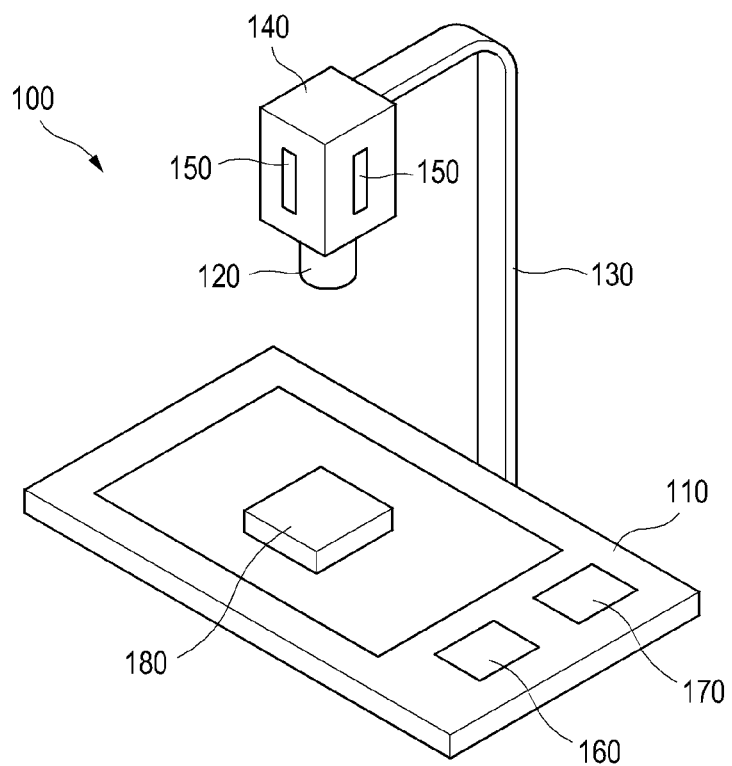
FIG. 1 shows a schematic diagram of one illustrative embodiment of a digital presenter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

FIG. 1 shows an illustrative embodiment of a digital presenter 100. The digital presenter 100 includes a base 110, a camera system 120 attached to the base 110 by a base arm 130, an illumination system 140 housing a plurality of illuminators 150, an illuminator control system 160 and a focus control system 170. In another embodiment, although not illustrated in FIG. 1, illuminators 150 may be disposed separately from the camera system 120, in a housing attached to the base 110 by another base arm (not shown). The camera system 120 may be a digital (still or video) camera capable of capturing images in electronic format and converting them into digital bit streams. Camera system 120 may also include optical components not shown in FIG. 1 (e.g., lenses, gratings, filters, mirrors, etc.) for properly directing, enhancing and collecting the light reflected from an object whose images are to be captured. In another embodiment, the digital presenter 100 may also include a liquid crystal display (LCD) or other display device (e.g., a flat cathode ray tube, a plasma display, etc.), to allow a user of presenter 100 to check and control the quality of images captured by the camera system 120. An object 180 such as a book, a transparency or a 3-dimensional model may be placed on the base 110. In one embodiment, the camera system 120 may be movable toward or away from the base 110 by means of a linear slide assembly, a pneumatic cylinder assembly or other conventional height adjustment means (not depicted in FIG. 1). The height adjustment means may be connected to a motor unit (not shown) so that the height of the camera system 120 can be adjusted automatically. In implementations where the illuminators 150 are disposed separately from the cameral system, the height of the illuminators (i.e., distance from the base 110) may also be adjusted by means of a linear slide assembly, a pneumatic cylinder assembly or other height adjustment means.

The plurality of illuminators 150 may illuminate the object 180 to provide illumination and/or visual effects so that the camera system 120 may detect and capture images of the object to be displayed.

Various light sources, such as light-emitting diodes (LEDs), halogen lamps, cold cathode ray tubes, incandescent lamps, etc., may be employed as illuminators 150. In one embodiment by way of non-limiting example, LED illuminators may be used where the illuminators 150 may be disposed around the camera system 120 to illuminate the object 180 to be displayed from above. In another embodiment, the illuminators 150 may be integrated with the base 110 so that illumination may be provided from the base, below the object 180 to be displayed.

In one illustrative embodiment, the illuminator control system 160 may individually energize and/or de-energize the plurality of illuminators 150 and may control the camera system 120 to capture images of the object 180 while the illuminators are being individually activated or energized and/or de-energized. For example, as each of the illuminators 150 is being individually energized and de-energized, camera system 120 may capture an image of the object 180 while the corresponding illuminator is being energized. The camera system 120 may be synchronized with the illuminator control system 160 so that camera system 120 captures a plurality of images each corresponding to a respective illuminator 150 being activated. Thus, for example, for each illuminator 150, an image may be captured when that illuminator 150 is energized and while the other illuminators of illuminators 150 are de-energized. In addition, the camera system 120 may include storage means not shown in FIG. 1 (e.g., random access memory (RAM), flash memory, tapes, disc drives, etc.) for storing the captured images.

In some illustrative embodiments, focus control system 170 may act to focus camera system 120 by adjusting the focus of a camera lens in system 120 and/or by raising, lowering or otherwise manipulating the camera system 120 relative to the base 110. Depth of field (DOF) may be described as a range of distances between camera system 120 and object 180 within which an image of object 180 may be considered acceptably sharp. The DOF may vary depending on camera type, aperture and focusing distance. Those skilled in the art in light of the disclosure provided herein will appreciate that when an image is described as being brought into focus, it may also mean that an image point is within the DOF.

In some illustrative embodiments, the focus control system 170 may cause the camera system 120 to capture images of the object 180 at a plurality of focal distances. Further, the camera system 120 may be synchronized with the focus control system 170 in order to controllably adjust camera focus and capture images of the object 180, where each image captured may correspond to a respective one of the focal distances. In addition, the camera system 120 may include a plurality of frame memories for storing the captured images.

Figure 2:
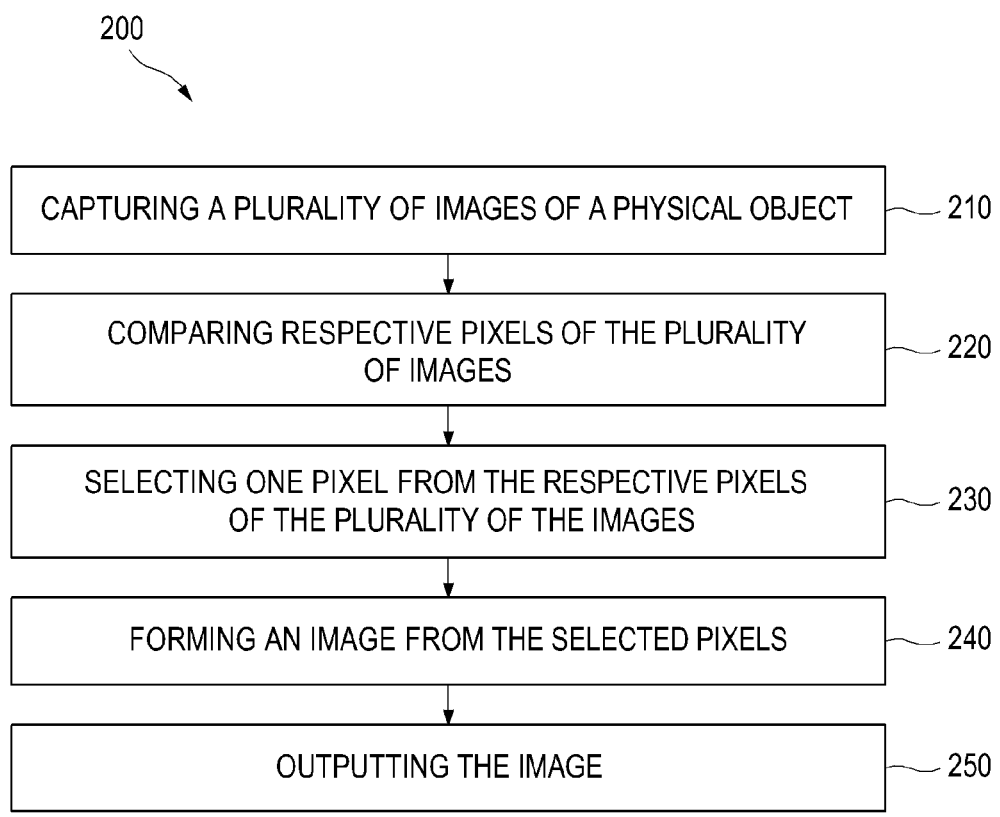
FIG. 2 shows a flow chart that illustrates displaying an image of an object according to one illustrative embodiment.

FIG. 2 shows a flow chart of an illustrative embodiment of a process 200 for displaying an image of an object. While the following description of process 200 refers to elements of the embodiment of FIG. 1 for illustrative purposes, claimed subject matter is not limited in this regard and hence process 200 should not be considered as limited to a process for capturing images using presenter 100. At block 210, a plurality of images of object 180 may be captured, for example, by the camera system 120. In one embodiment, each of the plurality of images may be captured when a different one of the plurality of illuminators has been energized while the other illuminators have been de-energized. Thus, while each illuminator has been energized, the camera system 120 may capture an image of the object 180 and stores that image in a memory (e.g., RAM, flash memory, etc.). For example, each image may be stored in a corresponding frame memory of the camera system 120. Block 210 may be repeated until all illuminators have been individually energized and corresponding images have been obtained. For example, if M illuminators are used, then M images of the object 180 may be obtained. In one illustrative embodiment, M may be 2 or greater. In other illustrative embodiment, M may range from 6 to 8. In other illustrative embodiments a subset of illuminators may be selectively energized and a corresponding set of images captured.

In another illustrative embodiment, at block 210, a plurality of images may be captured at a plurality of focal distances of the camera. For example, as the focus of the camera system 120 is changed, a plurality of images of the object 180 may be captured, each image corresponding to a different focal distance of the camera. This image acquisition process may be repeated and each image may be stored in a memory of the camera system 120. As explained above, instead of changing the focus of the camera system 120 directly, similar focus-changing effects may be achieved by moving the base 110 with respect to camera system 120.

At block 220, respective pixels of the plurality of images may be compared with each other and at block 230 one pixel may be selected from the respective pixels of the plurality of the images in response to comparing the respective pixels. At block 240, the selected pixels may be combined to form a final image to be output at block 250.

Figure 3:
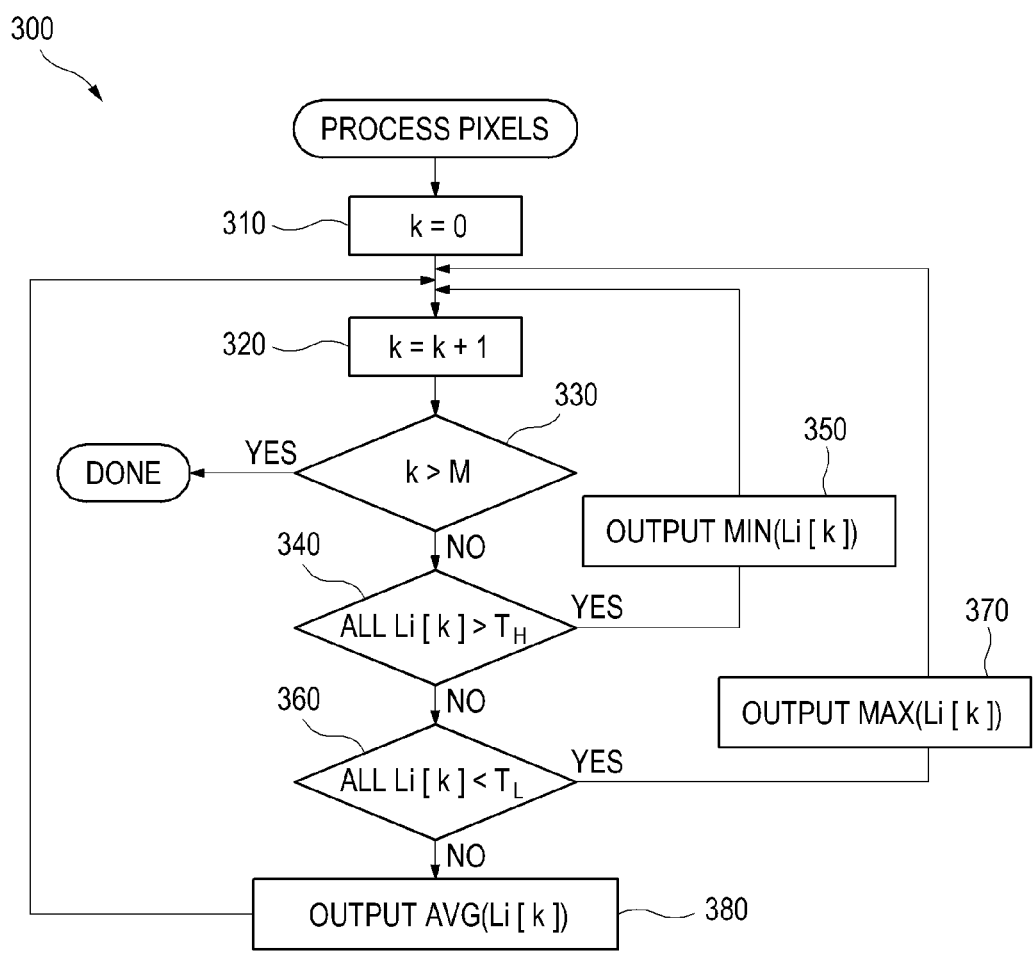
FIG. 3 shows a flow chart that illustrates processing pixels of images obtained by adjusting illuminators according to one illustrative embodiment.

FIG. 3 shows a flow chart of an illustrative embodiment of a process 300 for processing pixels of the images when the images are obtained by adjusting the illuminators.

In FIG. 3, K represents a sequence number for a Kth pixel of an image, and M represents a maximum number of pixels of the image. In one embodiment by way of non-limiting example, if the camera system 120 captures an image of the object 180 and converts it into an 8-by-8 pixel image, M is 64 and K varies between 1 and 64. Li represents the ith image among the plurality images obtained. In other embodiments, if the camera system 120 captures an image of the object 180 and converts it into a 16-by-16 pixel image, M is 256 and K varies between 1 and 256. For example, if 6 images have been obtained, i varies between 1 and 6. Similarly, if 8 images have been obtained, i varies between 1 and 8. Li[K] represents the Kth pixel of Li. To simplify, Li[K] also represents the brightness value of the Kth pixel.

At block 310 of process 300, K may be initialized to 0 and incremented by one at block 320. At block 330, if K is larger than M (maximum number of pixels), then all pixels may be considered to be processed, and process 300 may be terminated. Otherwise, at block 340, a determination is made as to whether all Kth pixels of the plurality of images have a brightness value greater than an upper threshold brightness value ($T_H$). Brightness, also known as luminance, may be considered as the amount of light that passes through or is emitted from a particular area, and the standard unit for luminance is candela per square meter ($cd/m^2$). In some embodiments, the upper threshold brightness value may range from about 5 $cd/m^2$ to about 20 $cd/m^2$, from about 10 $cd/m^2$ to about 20 $cd/m^2$, from about 15 $cd/m^2$ to about 20 $cd/m^2$, from about 5 $cd/m^2$ to about 10 $cd/m^2$, from about 5 $cd/m^2$ to about 15 $cd/m^2$, or from about 10 $cd/m^2$ to about 15 $cd/m^2$. In other embodiments, upper threshold brightness value may be about 5 $cd/m^2$, about 10 $cd/m^2$, about 15 $cd/m^2$, or about 20 $cd/m^2$.

When all pixels have a brightness value larger than the upper threshold brightness value, the surface of the object 180 may be determined to be "bright" at the image point corresponding to the Kth pixels. Thus, at block 350, the minimum brightness value of the Kth pixels may be outputted as a brightness value of the Kth pixel. If at least one of the pixels has brightness lower than the upper threshold value, process 300 may proceed to block 360.

At block 360, it may be determined whether all Kth pixels of the images have a brightness value smaller than a lower threshold brightness value ($T_L$). In some embodiments, the lower threshold brightness value may range from about 0.1 cd/m² to about 5 cd/m², from about 0.5 cd/m² to about 5 cd/m², from about 1 cd/m² to about 5 cd/m², from about 2.5 cd/m² to about 5 cd/m², from about 0.1 cd/m² to about 0.5 cd/m², from about 0.1 cd/m² to about 1 cd/m², from about 0.1 cd/m² to about 2.5 cd/m², from about 0.5 cd/m² to about 1 cd/m², or from about 1 cd/m² to about 2.5 cd/m². In other embodiments, the lower threshold brightness value may be about 0.1 cd/m², about 0.5 cd/m², about 1 cd/m², about 2.5 cd/m², or about 5 cd/m².

When all pixels have a brightness value smaller than the threshold value, the surface of the object 180 may be determined to be "dark" at the image point corresponding to the Kth pixels. Thus, at block 370, a maximum brightness value of the pixels may be outputted as a brightness value of the Kth pixel. If at least one of the pixels has brightness larger than the lower threshold value, process 300 may proceed to block 380.

At block 380, an average brightness of the pixels may be outputted as the brightness value of the Kth pixel. In calculating the average brightness value, various considerations may be made. For example, if the number of pixels sampled for a particular area of an image is relatively small (e.g., 5 or less images have been obtained), then all pixels may be used for the average brightness calculation. However, if the number of pixels sampled is relatively large (e.g., 10 or more images have been obtained), some pixels having higher or lower brightness values may be excluded from the average calculation.

When all pixels are processed in process 300, an image corresponding to the object 180 may be formed from the resulting (i.e., composite) brightness values (block 240). Thus, pixels of the image thus formed may be derived from various images among the plurality of images obtained for the respective illuminators 150. Thereafter, an image corresponding to the physical object 180 may be outputted through external display devices at block 250.

Figure 4:
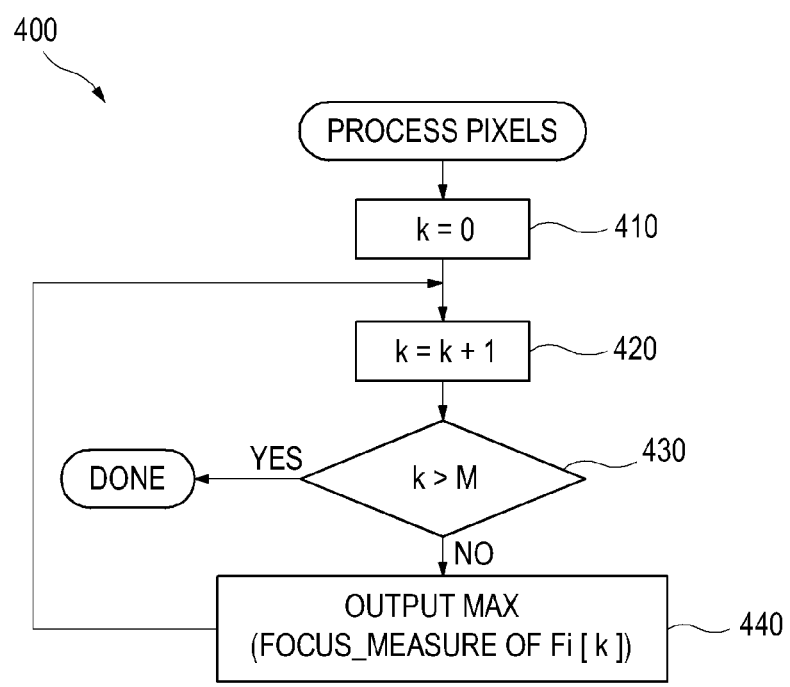
FIG. 4 shows a flow chart that illustrates processing pixels of images captured by adjusting camera focus according to one illustrative embodiment.

In another embodiment, referring back to FIG. 2, at block 210, a plurality of images may be captured by changing the focus of the camera system 120. FIG. 4 shows a flow chart of an illustrative embodiment of a process 400 for processing pixels of the images when the plurality of images are captured, where each image corresponds to different focal distances of the camera system 120.

In FIG. 4, K represents a sequence number for the Kth pixel of an image and M represents the maximum number of pixels of the image. For example, if the camera system 120 captures an image of the object 180 and converts it into an 8-by-8 pixel image, M is 64 and K varies between 1 and 64. Fi represents the ith image among the plurality images obtained. For example, if 6 images have been obtained, i varies between 1 and 6. Fi[K] represents the Kth pixel of Fi.

Referring back to FIG. 4, at block 410, K may be initialized to 0 and incremented by one at block 420. At block 430, if K is determined to be larger than M (maximum number of pixels), then it may be considered that all pixels have been processed, and process 400 may be terminated. Otherwise, at block 440, a focus measure of each Fi[K] may be calculated, and a maximum focus measure among the focus measures at the same image point of the object 180 may be outputted.

In one illustrative embodiment, an automatic selection method may be used to adjust the focus of the camera and determine a suitable pixel from a plurality of pixels of the images at the same image point. The automatic selection method may be a feature of optical systems capable of obtaining correct focus on a subject. In one illustrative embodiment, the automatic selection method may be a Shape from Focus (SFF) method. In an image, objects at different distances from a lens may be brought into focus at different distances. An SFF method may employ camera parameters such as lens position and/or focal length to adjust focusing of a camera system. According to the SFF method, the depth of the scene may be reconstructed by changing the optics of the camera until a point of interest is brought into focus. The change in the optics may be obtained by changing either the lens position and/or the object position relative to the camera.

A depth of a point of an object in focus may be obtained by using the following Gaussian lens formula: $1/f=1/u+1/v$, where f is the focal length, u is the distance of the object from the lens plane, and v is the distance of the focused image from the lens plane. A clear or focused image may be obtained by an image detector if the image detector coincides with the image plane, i.e., $s=v$. If the image detector is placed at a distance v ($s=v$), a sharp image may be obtained. However, if the image detector is placed at a distance s ($s \neq v$), then a blurred image of the point source may be obtained. The degree of blurring thus may depend on the focal length f of the lens and the distances u and s. If f and v are known, then the distance u of the object may be determined using the Gaussian lens formula provided above.

When $I(x,y)$ is the image intensity at a point $(x,y)$, the corresponding Laplacian is:

$$\nabla^2 I = \frac{\partial^2 I}{\partial x^2} + \frac{\partial^2 I}{\partial y^2}.$$

The Laplacian may be determined for each pixel of a given image window and a criterion function may be stated as:

$$\sum_x \sum_y \nabla^2 I(x, y) \text{ for } \nabla^2 I(x, y) \geq T$$

where T is a threshold value. However, in the case of the Laplacian the second derivatives in the x and y directions may have opposite signs and may tend to cancel each other. That is, the partial derivatives may be approximately equal in magnitude but opposing in sign. Thus, a modified Laplacian may be used as follows:

$$\nabla_M^2 I = \left|\frac{\partial^2 I}{\partial x^2}\right| + \left|\frac{\partial^2 I}{\partial y^2}\right|.$$

The modified Laplacian may be greater or equal in magnitude to the Laplacian. A discrete approximation to the Laplacian may be a 3×3 matrix or operator. In order to accommodate for possible variations in the size of texture elements, partial derivatives may be determined by using a variable spacing (step) between the pixels used to compute the derivatives. Accordingly, the discrete approximation to the modified Laplacian may be determined from:

$$\nabla_{ML}^2 I(x,y) = |2I(x,y) - I(x-\text{step},y) - I(x+\text{step},y)| + |2I(x,y) - I(x,y-\text{step}) - I(x,y+\text{step})|$$

Finally, a focus measurement at a point (i,j) may be computed as a sum of the modified Laplacian in a small window around (i,j), that are greater than a threshold value:

$$F(x, y) = \sum_{i=x-N}^{i=x+N} \sum_{j=y-N}^{j=y+N} \nabla_{ML}^2 I(i, j) \text{ for } \nabla_{ML}^2 I(i, j) \geq T,$$

where the parameter N determines the window size used to compute the focus measure. This focus measure may be termed the Sum-Modified-Laplacian (SML).

In SFF, a sequence of images may be obtained by continuously varying the distance between the lens and the image detector. At each pixel, the image frame which gives the maximum sharpness measure may be determined. The whole image sequence may be viewed as image volume Vi,x,y, where x, y, and i denotes the number of columns, rows and image frames respectively. For each image in the sequence, focus measure $\nabla_{ML}^2 I(x,y)$ may be computed at each pixel and a focus measurement volume MLi,x,y is obtained. A Sum of Modified Laplacian (SML) volume SMLi,x,y using F(x,y) may be computed where the SML volume represents a small (about 15×15) 2D image neighborhood around the pixel.

From an SML volume, the image frame among the image sequence that gives a maximum sharpness measure may be determined. This image frame may represent a final depth map. The gray level (proportional to image irradiance) of the pixel in the image frame thus determined may correspond to the gray level value of the focused image for that pixel. The camera parameter values for this image frame may be used to compute the distance of the object point corresponding to that pixel.

When all pixels are processed in FIG. 4, referring back to block 240 of FIG. 2, an image corresponding to the object 180 may be formed from the selected pixels. Thus, pixels of this image may be from various images among the plurality of images obtained by SFF. Thereafter, referring back to block 250 of FIG. 2, the image corresponding to the physical object 180 may be outputted through external display devices.

In another embodiment, a pre-setting method may be used instead of the automatic selection method to adjust the camera focus and determine a suitable pixel from a plurality of pixels of the images at the same point. Pre-setting method may include changing the focus of the lens from a lower point to a higher point at predetermined times. In some illustrative embodiments, the number of the predetermined times may range from 2 to 10, from 5 to 10, from 7 to 10, from 2 to 5, from 2 to 7, or from 5 to 7. In other illustrative embodiments, the number of the predetermined times may be 2, 5, 7 or 10. In order to determine pixels, the pre-setting method may also use the focus measure used for the SFF. In some embodiments, when all pixels are processed in FIG. 4, an image corresponding to the physical object 180 may be formed (block 240) from the determined pixels and outputted (block 250) through external display devices. In other embodiments, an image corresponding to the physical object 180 may be formed after at least some of the pixels are processed.

In other embodiments, other focus measurements may be used. For example, a focus measurement may be based on, but not limited to, high frequency energy in a power spectrum using FFT (fast Fourier transform), variance of image gray levels, L1-norm of image gradient, L2-norm of image gradient, L1-norm of second derivatives of image, energy of Laplacian, Modified Laplacian, histogram entropy of the image, histogram of local variance, and Sum-Modulus-Difference to name several approaches, and accordingly, the claimed subject matter is not limited in these respects.

In light of the present disclosure, those skilled in the art will appreciate that the apparatus, and methods described herein may be implemented in hardware, software, firmware, middleware, or combinations thereof and utilized in systems, subsystems, components, or sub-components thereof. For example, a method implemented in software may include computer code to perform the operations of the method. This computer code may be stored in a machine-readable medium, such as a processor-readable medium or a computer program product, or transmitted as a computer data signal embodied in a carrier wave, or a signal modulated by a carrier, over a transmission medium or communication link. The machine-readable medium or processor-readable medium may include any medium capable of storing or transferring information in a form readable and executable by a machine (e.g., by a processor, a computer, etc.).

Those of ordinary skill will appreciate that the functions performed in the methods may be implemented in differing order, and that the outlined steps are provided as examples, and some of the steps may be optional, combined into fewer steps, or expanded to include additional steps without detracting from the essence of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus to display an image, comprising:
a base to support an object, the base including a base arm;
an illumination system that includes a plurality of illuminators configured to selectively illuminate the object;
a camera system coupled to the base arm, the camera system configured to:
capture a plurality of images of the object, wherein each of the plurality of images is captured for the object at different illumination conditions, wherein the different illumination conditions are obtained by individual energization and de-energization of the plurality of illuminators and wherein each of the plurality of images corresponds to a different respective illumination condition of the object;
determine a brightness value for each pixel for each of the plurality of images;
compare the brightness value, of corresponding pixels that represent a common region of the object from each of the plurality of images, with a first threshold value;
compare the brightness value, of corresponding pixels that represent the common region of the object from each of the plurality of images, with a second threshold value;
average the brightness values of the corresponding pixels, if the brightness value of each corresponding pixel is between the first threshold value and the second threshold value, to obtain respective averaged brightness values of the corresponding pixels from each of the plurality of images;
determine a representative pixel from the corresponding pixels from each of the plurality of the images, wherein determined representative pixels include the respective average brightness values if the brightness value of each corresponding pixel is between the first threshold value and the second threshold value;
form an image from the determined representative pixels; and output the image;
an illuminator control system configured to control the plurality of illuminators; and
a focus control system configured to adjust a focus of the camera system.

2. The apparatus of claim 1, wherein the illuminator control system is configured to energize and de-energize the plurality of illuminators and is configured to control the camera system to capture an image of the object while at least some of the illuminators are energized.

3. The apparatus of claim 2, wherein the illuminators are capable of being individually energized and de-energized.

4. The apparatus of claim 1, wherein determination of the representative pixel from the corresponding pixels of each of the plurality of the images comprises selection of the representative pixel, from the corresponding pixels, that includes a relatively lower brightness if the brightness value of each corresponding pixel is higher than the first threshold value.

5. The apparatus of claim 1, wherein selecting determination of the representative pixel from the corresponding pixels from each of the plurality of the images comprises selection of a representative pixel, from the corresponding pixels, that includes a relatively higher brightness value if the brightness value of each corresponding pixel is lower than the second threshold value.

6. The apparatus of claim 1, wherein to determine the representative pixel, the camera system comprises is further configured to:
select the representative pixel, from the corresponding pixels, that includes a relatively lower brightness value if the brightness value of each corresponding pixel is higher than the first threshold value; and
select the representative pixel, from the corresponding pixels, that includes a relatively higher brightness value if the brightness value of each corresponding pixel is lower than the second threshold value.

7. A method to display an image, comprising:
selectively capturing a plurality of images of an object while a plurality of illuminators are selectively controlled such that each of the plurality of images corresponds to a different illumination condition of the object;
determining a brightness value for each pixel for each of the plurality of images;
comparing the brightness value, of corresponding pixels that represent a common region of the object from each of the plurality of images, with a first threshold value;
comparing the brightness value, of corresponding pixels that represent the common region of the object from each of the plurality of images, with a second threshold value;
averaging the brightness values of the corresponding pixels, if the brightness value of each corresponding pixel is between the first threshold value and the second threshold value, to obtain respective averaged brightness values of the corresponding pixels from each of the plurality of images;
determining a representative pixel from the corresponding pixels of each of the plurality of the images, wherein determined representative pixels include the respective average brightness values if the brightness value of each corresponding pixel is between the first threshold value and the second threshold value;
forming the image from the determined representative pixels; and
outputting the image.

8. The method of claim 7, wherein the determining the representative pixel from the corresponding pixels from each of the plurality of the images comprises:
selecting the representative pixel, from the corresponding pixels, that includes a relatively lower brightness value if the brightness value of each corresponding pixel is higher than the first threshold value.

9. The method of claim 7 wherein the determining the representative pixel from the corresponding pixels from each of the plurality of the images comprises selecting the representative pixel, from the corresponding pixels, that includes a relatively higher brightness value if the brightness value of each corresponding pixel is lower than the second threshold value.

10. The method of claim 7 wherein determining the representative pixel comprises:
selecting the representative pixel, from the corresponding pixels, that includes a relatively lower brightness value if the brightness value of each corresponding pixel is higher than the first threshold value; and
selecting the representative pixel, from the corresponding pixels, that includes a relatively higher brightness value if the brightness value of each corresponding pixel is lower than the second threshold value.

11. A non-transitory processor-readable storage medium that includes instructions stored thereon that, in response to execution by a processor, cause the processor to control an apparatus to perform a method comprising:
selectively capturing a plurality of images of an object while a plurality of illuminators are selectively controlled such that each of the plurality images corresponds to a different illumination condition of the object;
determining a brightness value for each pixel for each of the plurality of images;
comparing the brightness value, of corresponding pixels that represent a common region of the object from each of the plurality of images, with a first threshold value; and
comparing the brightness value, of corresponding pixels that represent the common region of the object from each of the plurality of images, with a second threshold value;
averaging the brightness values of the corresponding pixels, if the brightness value of each corresponding pixel is between the first threshold value and the second threshold value, to obtain respective averaged brightness values of the corresponding pixels from each of the plurality of images;
determining a representative pixel from the corresponding pixels of each of the plurality of the images, wherein determined representative pixels include the respective average brightness values if the brightness value of each corresponding pixel is between the first threshold value and the second threshold value;
forming an image from the determined representative pixels; and
outputting the image.

12. The storage medium of claim 11 wherein the determining the representative pixel from the corresponding pixels from each of the plurality of the images comprises selecting the representative pixel, from the corresponding pixels, that includes a relatively higher brightness value if the brightness value of each corresponding pixel is lower than the second threshold value.

13. The storage medium of claim 11 wherein determining the representative pixel comprises:

selecting the representative pixel, from the corresponding pixels, that includes a relatively higher brightness value if the brightness value of each corresponding pixel is higher than the first threshold value; and selecting the representative pixel, from the corresponding pixels, that includes a relatively higher brightness value if the brightness value of each corresponding pixel is lower than the second threshold value.

\* \* \* \* \*